US010778599B2

(12) United States Patent
Bryc et al.

(10) Patent No.: US 10,778,599 B2
(45) Date of Patent: Sep. 15, 2020

(54) PREDICTIVE SCALING OF COMPUTING RESOURCES

(71) Applicant: Home Box Office, Inc., New York, NY (US)

(72) Inventors: Michal M. Bryc, Seattle, WA (US); Jared L. Reisinger, Redmond, WA (US); Lilia Abaibourova, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 214 days.

(21) Appl. No.: 15/474,121

(22) Filed: Mar. 30, 2017

(65) Prior Publication Data

US 2018/0287956 A1    Oct. 4, 2018

(51) Int. Cl.
| | |
|---|---|
| *G06F 15/16* | (2006.01) |
| *H04L 12/911* | (2013.01) |
| *H04L 29/08* | (2006.01) |
| *H04L 12/46* | (2006.01) |
| *G06F 9/50* | (2006.01) |

(52) U.S. Cl.
CPC ............ *H04L 47/70* (2013.01); *G06F 9/5005* (2013.01); *H04L 12/4641* (2013.01); *H04L 67/32* (2013.01); *G06F 2209/5019* (2013.01)

(58) Field of Classification Search
CPC ..................................................... H04L 47/70
See application file for complete search history.

(56) References Cited

U.S. PATENT DOCUMENTS

| | | | |
|---|---|---|---|
| 8,312,460 B1 | 11/2012 | Blanding | |
| 10,361,924 B2 * | 7/2019 | Baughman | ............ H04L 41/145 |
| 10,581,988 B2 * | 3/2020 | Dintenfass | .............. H04L 67/22 |
| 2011/0138055 A1 | 6/2011 | Daly et al. | |
| 2012/0157106 A1 * | 6/2012 | Wang | .................... H04W 24/08 455/446 |
| 2012/0265881 A1 * | 10/2012 | Chen | ....................... H04L 12/12 709/226 |
| 2013/0047041 A1 * | 2/2013 | Chen | ..................... G06F 11/004 714/47.3 |
| 2013/0054804 A1 | 2/2013 | Jana et al. | |
| 2014/0115592 A1 * | 4/2014 | Frean | .................... G06F 9/5027 718/102 |

(Continued)

OTHER PUBLICATIONS

International Search Report and Written Opinion for International Application Serial No. PCT/US2018/020627 dated Jun. 1, 2018, 14 pages.

*Primary Examiner* — Douglas B Blair
(74) *Attorney, Agent, or Firm* — Amin, Turocy & Watson, LLP

(57) ABSTRACT

The described technology is generally directed towards predicting a need for provisioned (e.g., cloud computing) resources so that the provisioned resources are proactively provisioned and operational before their actual need. Historical data is used to predict upcoming resource demand so that resources begin to be scaled up to meet demand in advance, at a prediction time, given that there is a "spin-up" delay between requesting resources and their actual availability. The predictive resource provisioning is adaptable to override customary historical data with expected exceptions, and is flexible to handle variable spin-up times, constraints, and optimizations.

20 Claims, 13 Drawing Sheets

(56) References Cited

U.S. PATENT DOCUMENTS

| | | | |
|---|---|---|---|
| 2014/0129719 A1* | 5/2014 | Weber | H04L 47/823 709/226 |
| 2014/0278808 A1* | 9/2014 | Iyoob | G06Q 30/0206 705/7.35 |
| 2014/0317166 A1* | 10/2014 | Iyoob | G06Q 30/0631 709/201 |
| 2015/0341240 A1* | 11/2015 | Iyoob | H04L 43/08 709/201 |
| 2016/0094483 A1* | 3/2016 | Johnston | H04L 47/827 709/226 |
| 2016/0125332 A1* | 5/2016 | Moore | G06Q 10/06312 705/7.22 |
| 2016/0150280 A1* | 5/2016 | Cui | H04N 21/252 725/14 |
| 2017/0244787 A1* | 8/2017 | Rangasamy | H04L 41/0654 |
| 2017/0295082 A1* | 10/2017 | Wu | H04L 43/14 |
| 2018/0024861 A1* | 1/2018 | Balle | G06F 3/0613 718/104 |
| 2018/0097744 A1* | 4/2018 | Hu | H04L 47/823 |
| 2018/0136980 A1* | 5/2018 | Shaffer | G06F 9/5061 |
| 2018/0260253 A1* | 9/2018 | Nanda | G06F 9/4806 |
| 2018/0267832 A1* | 9/2018 | Biener | G06F 9/5061 |
| 2020/0145506 A1* | 5/2020 | Dintenfass | H04L 67/22 |

* cited by examiner

PREDICTIVE SCALING OF COMPUTING RESOURCES

BACKGROUND

Many web applications such as those that provide data services use large amounts of provisioned network resources. These applications/data services may be run on cloud computing resources to service client requests. For example, Amazon® Elastic Compute Cloud (Amazon EC2®) is a cloud-based service that supports enterprise data services by providing variable computing capacity for a fee. It is also feasible to provision computing resources within an enterprises' own network hardware, and re-provision them as needed, and/or supplement enterprise network hardware with cloud computing resources when enterprise network capacity is exceeded.

The provisioning and deprovisioning of computing resources can be significant in terms of cost savings, as the load handled by a data service can be highly variable, such as peaking at different times during the month when payroll is processed, during a peak shopping season, and so on. Thus, provisioning and deprovisioning technology attempts to match provisioned computing resources to current needs. For example, Amazon® has a concept of an Auto Scaling Group (ASG) in its cloud system, which automatically provisions (scales up) additional EC2® resource instances after detecting increases in certain traffic/load-related metrics, such as CPU or memory utilization. Deprovisioning is similarly automatic as load decreases.

However, contemporary provisioning technology including EC2® reacts to events as they transpire, including events that indicate increased traffic and load on software services. When provisioning of new resource instances is needed, it takes a few minutes for these additional instances to "spin up" to handle the increase in load. More particularly, the total time taken for provisioning new resources—from the time of the increased traffic to the availability of metrics showing the increase, to the reaction of the system to decide to scale up, to the in-service availability of the additional resources—is on the order of minutes. During this scaling-up time period, the service or system is often unable to handle the full load.

An alternative approach is to provision as many computing resources as needed to handle peak load, and leave these resources in place (over-provision) during periods of low traffic. For example, in Amazon's DynamoDB®, there is no automatic scaling built into the system. The DynamoDB® technology instead relies on the client to provision sufficient read and write capacity to handle peak load, and generally leave this peak-provisioning in place during periods of low traffic (although some client-controlled reduction in capacity is available to a limited extent). This wastes resources, costing money whether an enterprise has to buy additional internal network capacity to over-provision resources, or pay for dedicated external cloud computing resources that often go unused.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards predicting an upcoming need to increase a set of provisioned resources currently in use from a current number in use to an increased number. Aspects include proactively requesting that the set be increased with additionally provisioned resources based upon the predicting of the upcoming need, in which the proactively requesting of the additionally provisioned resources occurs at a prediction time that is before actual need of the additionally provisioned resources, to provide time for the additionally provisioned resources time to become operational.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
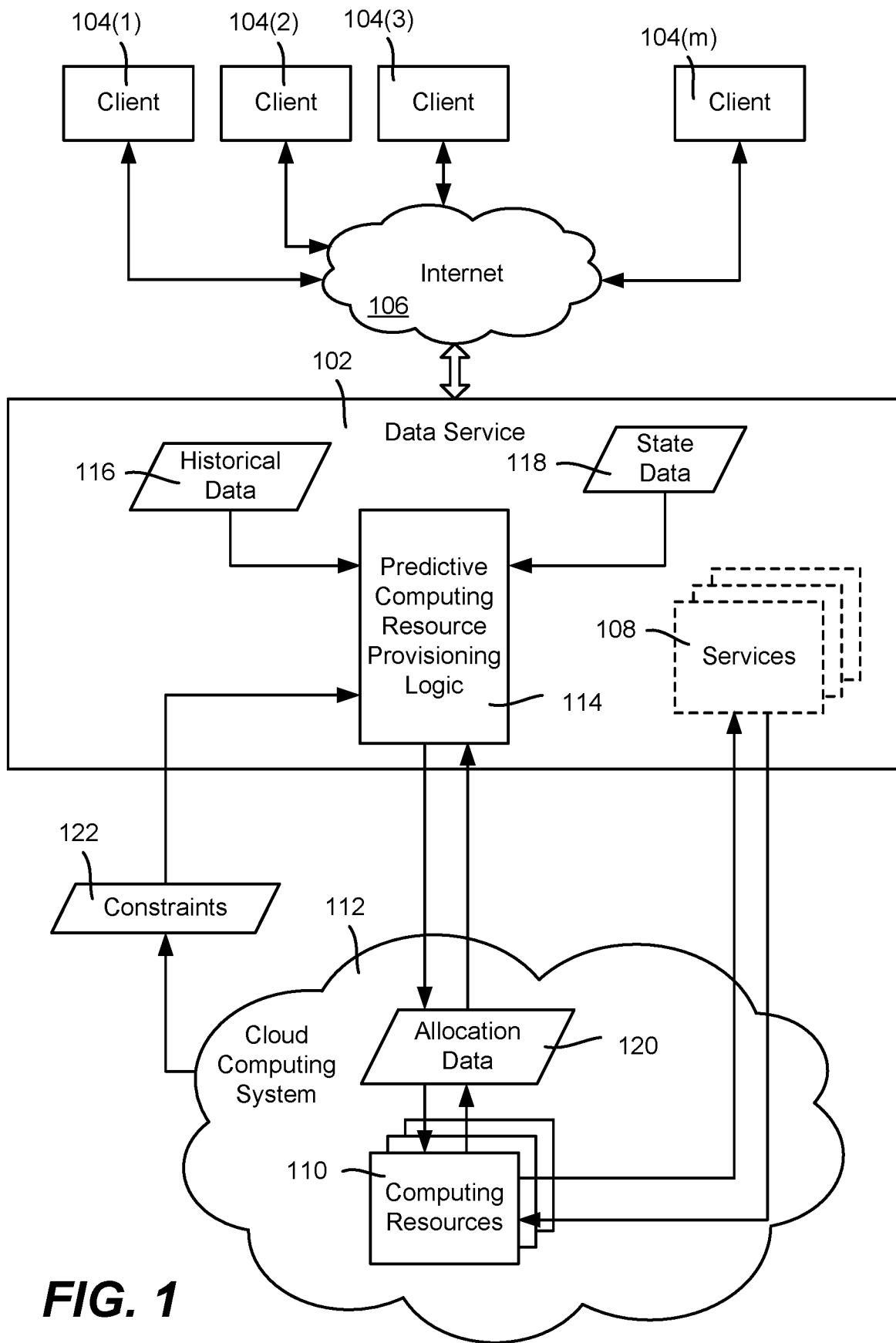
FIG. 1 is an example block diagram representation of a data service using historical data and state data to proactively provision computing resources, according to one or more example implementations.

Various aspects of the technology described herein are generally directed towards proactively provisioning computing resources based upon predicted need, to scale to meet demand before the actual demand exists. In general, this predictive scaling of computing resources provides adequate computing resources to handle traffic at peak times, while reducing idle resource consumption (which typically equates to monetary cost) at other times.

One or more aspects are directed towards technology that uses historical data such as past load, traffic, and/or other metrics related to cloud computing resources and/or other computing resources, in order to predict near term traffic and provision an appropriate amount of computing resources needed in order to meet that increased traffic if and when it occurs. In this way, the predicted increase in traffic/load, rather than the actual current load, is used to provision resources.

Thus, for example, although it still takes on the order of minutes to scale up an Auto Scaling Group, when the technology described herein predicts an upcoming spike in traffic to occur at a provisioning time, a request to scale up computing resources is made an appropriate number of minutes beforehand at a prediction time. As a result, if the traffic does increase as expected, the computing resource instances are provisioned and spun up by the provisioning time, that is, in sufficient time to handle the increase.

As will be understood, the technology described herein takes into account the fact that that changes in provisioned resources are not instantaneous, and therefore makes the changes in advance of actual need. Moreover, the technology described herein is able to take into account any other constraints on the ability to adjust the computing resources; for example, DynamoDB® provisioned capacity can only be reduced a certain number of times per day. Thus any changes to DynamoDB® provisioned capacity are generally made subject to such constraints.

It should be understood that any of the examples herein are non-limiting. For instance, some of the examples refer to cloud computing systems that provision computing resource instances such as virtual machines, each virtual machine having certain processing and memory resources. However, the technology described herein may be used in an enterprise's own network hardware instead of or in addition to cloud-based services, and may be used on virtual and/or physical machines. Moreover, the technology is independent of any particular virtual machine or other machine configuration, and indeed, may be used to allocate more specific computing resources (memory and CPU resources) within virtual and/or physical machines, and similarly may be used to allocate storage, bandwidth, number of connections and other computing resources. As such, the present invention is not limited to any particular embodiments, aspects, concepts, structures, functionalities or examples described herein. Rather, any of the embodiments, aspects, concepts, structures, functionalities or examples described herein are non-limiting, and the present technology may be used various ways that provide benefits and advantages in computing and/or resource provisioning in general.

As shown in the example block diagram of FIG. 1, a data service 102 supports a number of clients 104(1)-104(m), which for example may be coupled to the data service 102 over the internet 106. For example the data service 102 may be a provider of streaming video content, such as movies and television shows, in which event the client requests are generally related to obtaining data representing the movies and television shows being offered, as well as for data corresponding to the streamed content once a movie or television show has been selected for streaming to a user's client device.

In the example of FIG. 1, at least some of the services 108 that provide the responses to the client requests may be hosted on computing resources 110 of a cloud computing system 112; for example the computing resources 110 may be implemented in virtual machines that run instances of the services 108. In general, the number of the computing resources 110 (e.g., corresponding to the number of service instances needed) may be scaled up or down to react to current demand. However, as set forth above, contemporary cloud computing systems take a significant amount of time, e.g. on the order of minutes, to start up new computing resources once an increase in demand is detected.

The technology described herein comprises predictive computing resource provisioning logic 114 that uses predictive data comprising historical data 116 and/or state data 118 to proactively provision computing resources in advance of their actual need. Example historical data 116 includes (but is not limited to) prior traffic patterns, prior load (e.g., the size and shape of the traffic) and any other metrics that may be used to predict a need for computing resources. Example state data 118 may include (but is not limited to) the current time of day and day of week, whether the day is a holiday, geographical information, and so forth. Thus, for example, historical data may indicate that an extremely popular television series with devoted fans has previously caused a significant amount of request-response traffic that spikes sharply at 9:00 pm on Sunday nights. The predictive computing resource provisioning logic 114 uses this information regarding the anticipated traffic spike to provision sufficient resources in advance of the actual spike, which avoids angering or at least frustrating many of those fans who would be otherwise unable to interact to view the show during the reactive delay period that otherwise occurs in reactively spinning up the new resources, as is conventionally done.

Other state data 118 that may be used as predictive data may be specific to the data service 102. For example, for a streaming video service, a heavily promoted first-time television special that is expected to draw a huge number of viewers does not have any direct historical data regarding prior viewership, but may have other state data (e.g., determined from analyzing social media content, surveys, pay-per event subscriptions and so on) indicating that a spike in viewership is likely to occur at the time it is first offered. Another example of state data that may be used as predictive data is whether a popular show is premiering a new episode or is re-running an episode (already or previously available for streaming) in its regular time slot. A movie that is run for the first time on a given channel, which at that time also becomes available for streaming, may result in a spike in streaming video viewing requests. Such prediction/state data may be considered override data in that it may be used to override what has been historically collected with respect to that time slot during non-exceptional program offerings.

Allocation data 120 is another factor that is generally state data of the cloud computing system 112 with respect to the computing resources currently allocated to the data service 102. As shown in FIG. 1, the predictive computing resource provisioning logic 114 may read or write the allocation data 120, e.g., via suitable requests, (although as will be understood, writing the allocation data may be sufficient in alternative implementations). For example, depending on the computing resource parameters available for changing the current allocation, such as the number of virtual machines, the memory and/or the processing power, the data service can modify the amount of computing resources needed. The cloud computing system 112 (e.g., the vendor) may work with the data service 102 (e.g., the customer) to meet the customer needs.

Also shown in FIG. 1 is the concept of constraints 122. One straightforward constraint is the amount of time needed to spin up computing resource instances, which even if generally constant needs to be known to the predictive computing resource provisioning logic 114. It is also possible that the time to increase capacity is not always constant, e.g., the cloud computing system 112 may be able to spin up on the order of dozens of new instances in constant time, however if hundreds or even thousands more of such instances are needed, it may take longer, and the predictive computing resource provisioning logic 114 may need to know of any such issues.

Another example constraint 122 relates to re-provisioning limits. For example, DynamoDB® is unable to have its capacity changed too often; e.g., the settings for a DynamoDB® table cannot be decreased more than four times per table per day. Thus, the predictive data (e.g., historical data 116) may be analyzed and used for provisioning in the context of such a constraint, so that, for example, any temporary increase in the capacity of DynamoDB® table to handle a large spike can be followed at an appropriate time by a subsequent decrease request; otherwise such a temporary increase would not be able to be decreased and thus result in the extra capacity being unnecessarily purchased for the remainder of the day.

FIG. 1 generally represents an implementation that processes the predictive data comprising historical data 116 and/or state data somewhat regularly, e.g., as re-provisioning may be needed (on demand/dynamically) to determine the anticipated need for resources. For example, a straightforward use of historical data is to dynamically look at what happened previously under similar state conditions, (e.g., a week ago), possibly within some (e.g., a two-hour) time window, and predict traffic/load accordingly.

In an alternative implementation, the predictive data including any historical data 116 instead may be separately (e.g., offline) processed into a predictive schedule or the like that is read as needed to re-provision resources. Indeed, with a re-provisioning limit constraint such as a limit of four decreases per day, a daily schedule may be advantageous because an entire day's history may need to be considered with respect to selecting certain predicted resource decreases instead of decreasing each time load decreases and reaching the limit too soon, as exemplified below with reference to FIG. 6B.

Figure 2:
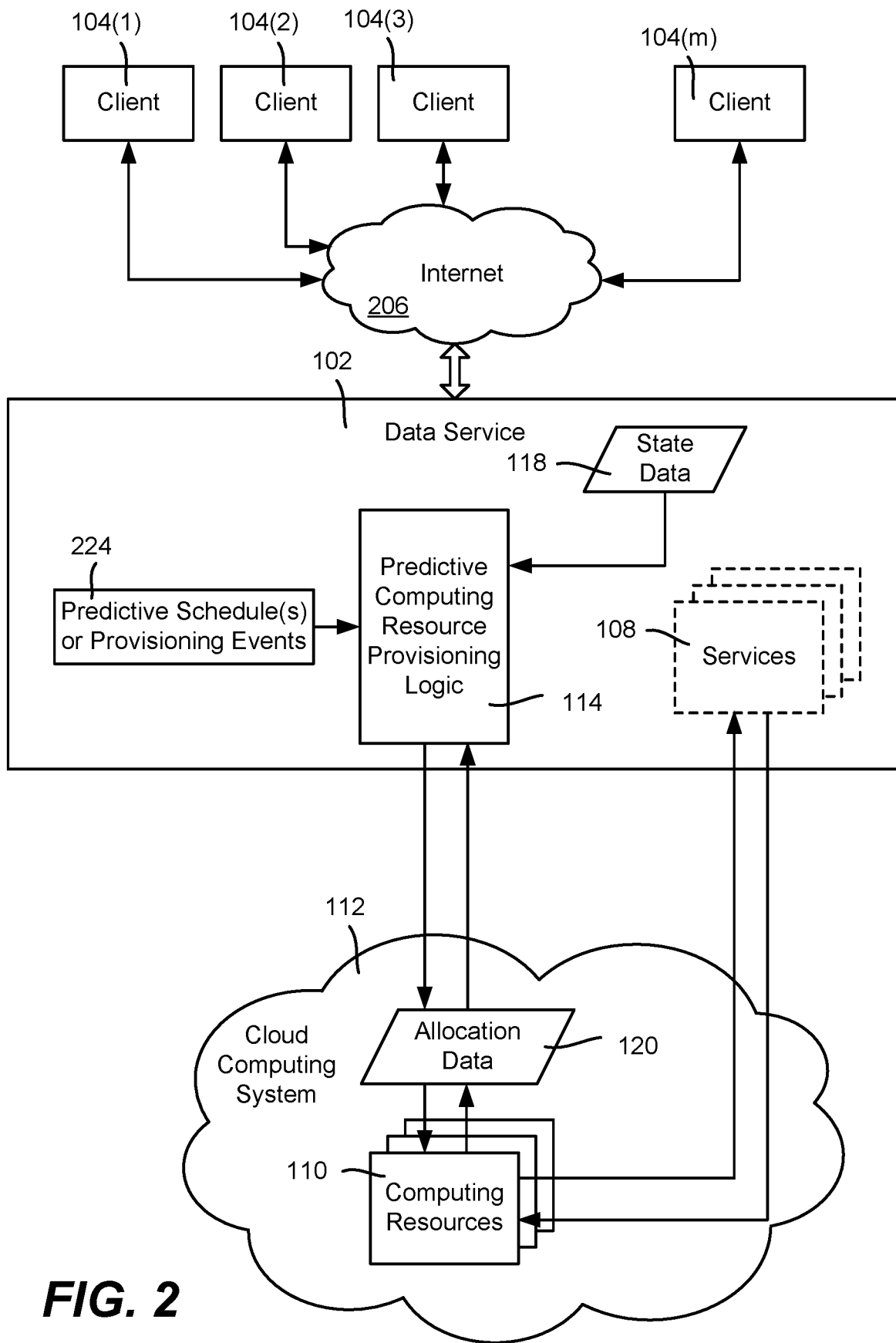
FIG. 2 is an example block diagram representation of a data service using a schedule compiled from historical data and other data to proactively provision computing resources, according to one or more example implementations.

As represented in FIG. 2 via block 224, in an alternative implementation the predictive computing resource provisioning logic 114 may read an offline-generated schedule, and/or receive a provisioning event (e.g., based upon such a schedule), according to which the predictive computing resource provisioning logic 114 specifies the proactive provisioning of resources to the cloud system 112 or the like.

For example, the offline-computed schedule 224 may be read by the predictive computing resource provisioning logic 114 or by a provisioning event generator 770 (FIG. 7) or the like that generates provisioning events. The schedule may be read as appropriate, e.g., periodically, such as every minute, depending on how frequently a change may be needed. Note that if the cloud system or internal network that operates the provisioned resources is capable of interpreting a schedule, it is also feasible to provide the cloud system or the like with such a schedule, e.g., hourly, daily, weekly and so on and have the resources provisioned thereby according to the current time, instead of periodically or otherwise sending individual or grouped instructions.

Figure 3:
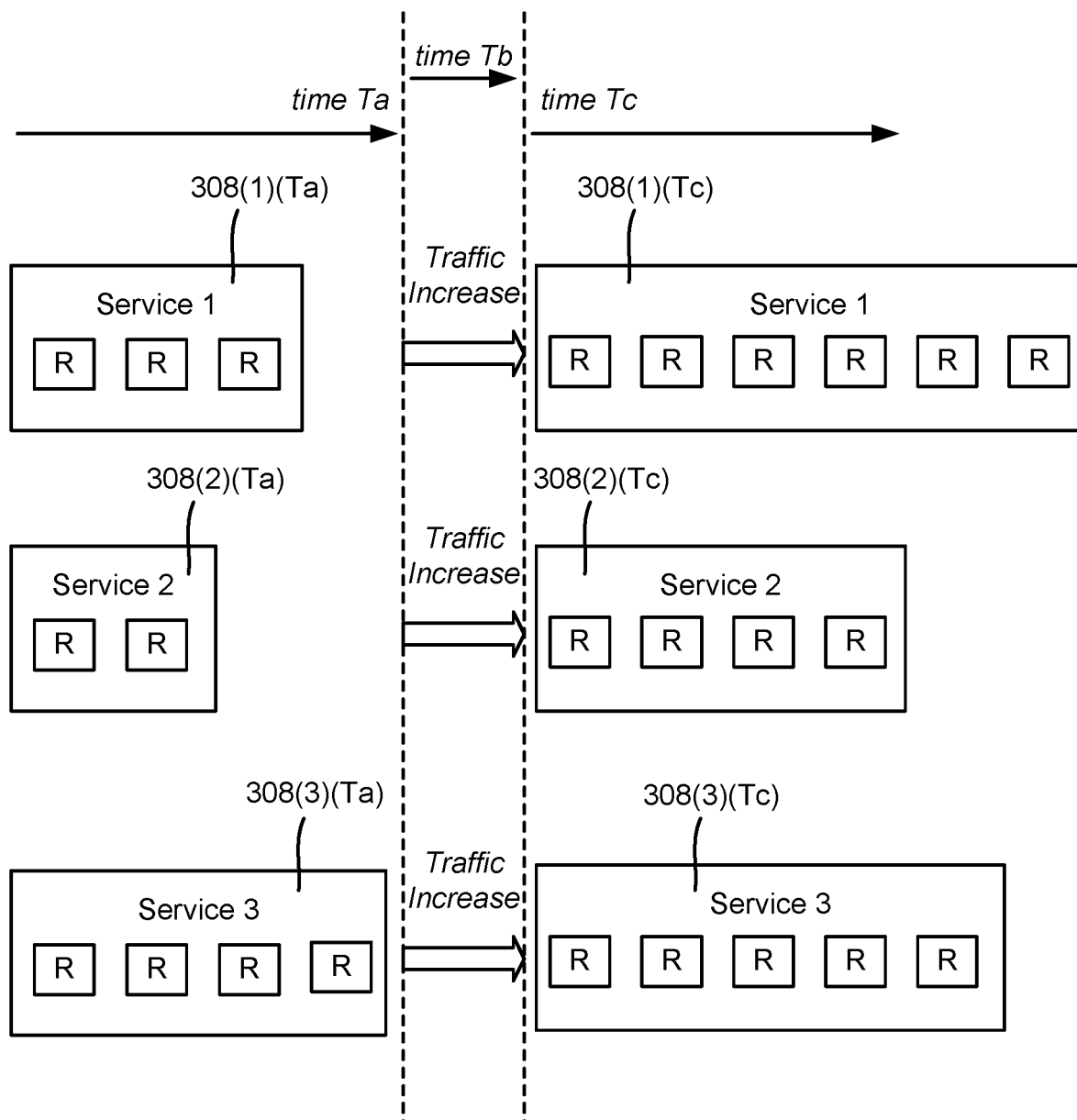
FIG. 3 is an example representation of how various computing resources may be proactively increased via predictive provisioning, according to one or more example implementations.

FIG. 3 shows the concept of a number of (e.g., three) different services 308(1)-308(3) having a number of corresponding resources (each labeled "R") running on the cloud computing system to support that service's functionality. In FIG. 3, the number of boxes labeled "R" in each service represents the current number of resource instances allocated to that service at a given time. Thus for example, at time Ta, service 1 is labeled 308(1)(Ta) to represent service 1 at time Ta, which as can be seen, has three resource instances allocated thereto. At time Ta, the service 308(2)(Ta) has two resource instances, and the service 308(3)(Ta) has four resources instances. Note that FIG. 3 is only for purposes of illustration, and that any practical number of services may be running concurrently; for example, any service may have any practical number of resource instances allocated to that service at a given time, such as on the order of tens, hundreds, thousands or even more.

As represented in FIG. 3, at some time Tb, the predictive computing resource provisioning logic 114 (FIG. 1) or an offline scheduler has predicted (e.g., based upon the historical data 116, state data 118, and possibly the current allocation data 122) that a traffic increase is likely forthcoming. Thus, starting at time Tb, (the prediction time), the predictive computing resource provisioning logic 114 instructs the cloud computing system 112 to begin spinning up new computing resources. Note that the increase request may be on a per-service basis, e.g., service 1 needs to increase to from three to six resource instances, service 3 to increase from two to four resource instances, and service 3 from four to five instances, as represented by the services 308(1)(Tc), 308(2)(Tc) and 308(3)(Tc). Thus, by the provisioning time Tc, which is some (generally relatively short) time before the actual traffic/load increase starts, the services already have the sufficient resource instances to handle the increased traffic/load.

Note that depending on the cloud computing system's (or enterprise network's) provisioning specifications, a change in provisioned resources may or may not need to be based upon the amount currently allocated. For example, one implementation may need to know the number currently allocated and ask for an increase relative to that number, (e.g., the provisioned resources currently number 150, and for some given service 1 the predictive computing resource provisioning logic 114 wants a total of 350 and thus requests an increase of 200). Alternatively, it may be sufficient for the predictive computing resource provisioning logic 114 to request the number of resource instances that each service needs at a given time, (e.g., allocate 350 total resources for service 1), with the cloud computing system able to perform the math to allocate/deallocate resource instances to provide the requested number of resource instances as soon as possible for each service. Other ways to request the provisioning of resources are feasible; e.g., a request may be for the cloud system to handle so many writes per second, so many reads per second and so on, (and/or a total amount of processing power and memory) with the cloud computing system determining the amount of resources needed to handle the specified amount.

In a situation where the cloud computing system (or enterprise network) does not allow such direct numeric control of provisioned computing resources, it is also feasible for the predictive computing resource provisioning logic 114 to predictively provision the resources needed by sending simulated traffic, in advance, which causes the amount of provisioned resources to increase by the appropriate time of actual need. Such simulated traffic may be ramped up over time so that the generally simultaneous actual traffic gets through and is properly handled.

Figure 4:
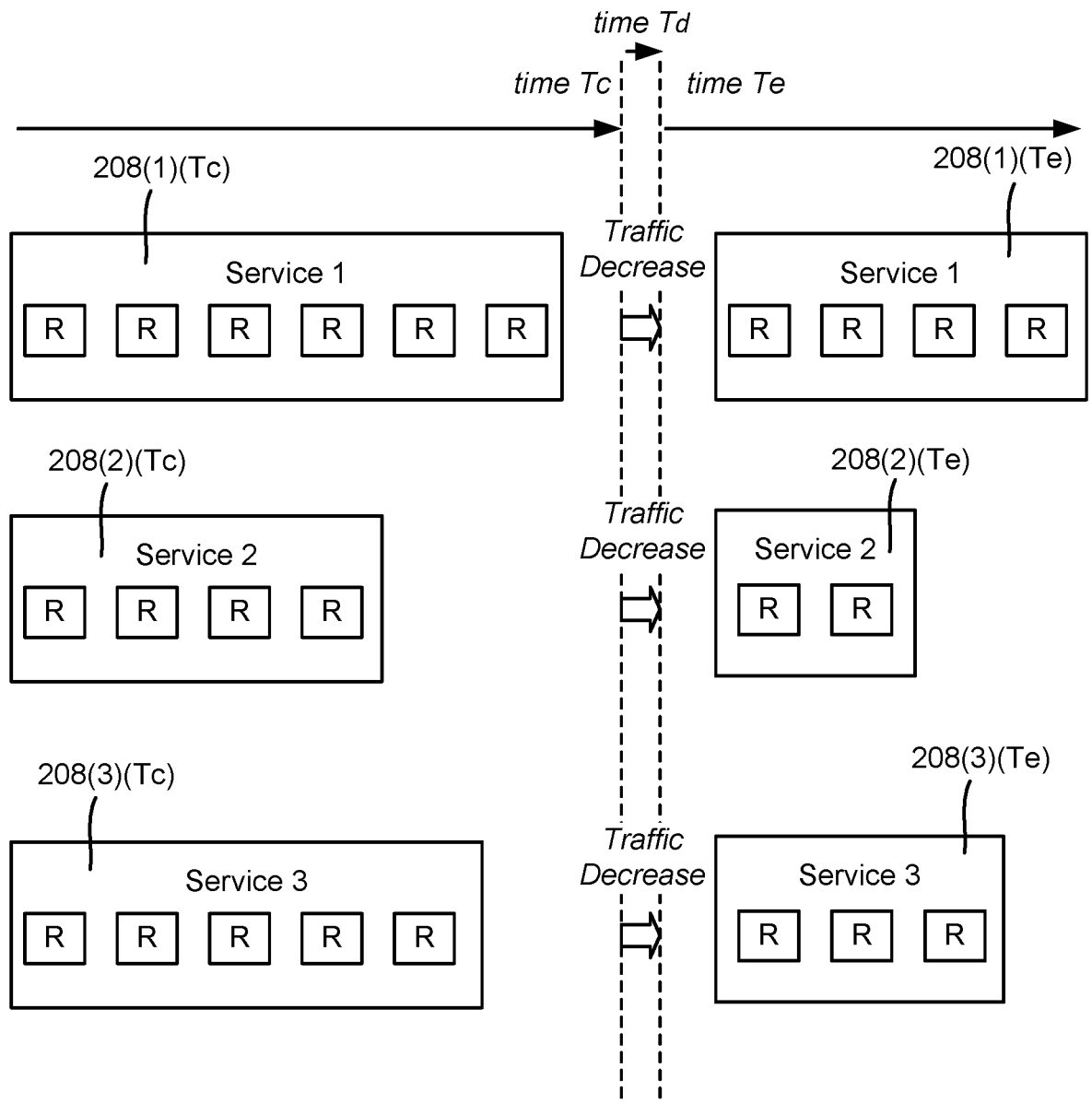
FIG. 4 is an example representation of how various computing resources may be proactively or otherwise deprovisioned, according to one or more example implementations.

FIG. 4 represents a decrease in traffic, with the depicted blocks generally labeled similarly to FIG. 3. In FIG. 4, delayed deallocation of resources (at least in many scenarios) is not as significant as missing client requests due to inadequate resources, and thus may be left to the cloud computing system to perform automatically if the cloud computing system can do so. Notwithstanding, there is a cost associated with having idle resources, and thus predictive deprovisioning may provide benefits. Note however that the time lag to deprovision existing computing resources (time Td in FIG. 4) is typically smaller relative to the time lag to provision new computing resources (time Tb in FIG. 3), and thus controlled deprovisioning based upon actual traffic/load rather than predictive deprovisioning based upon anticipated traffic/load may not save much money, yet allow for a more conservative approach that avoids the possibility of deprovisioning too quickly.

Still further, whether or not predictive deprovisioning is used, and even when automatic deprovisioning is available, controlled deprovisioning may be useful, including based upon anticipated traffic/load. For example, consider a situation (based upon history) in which one sharp spike is likely to be followed fairly closely in time by a smaller spike. A controlled reduction in resource instances (based upon predicting the second spike before it actually occurs) can ensure that the data service has sufficient resources allocated in the cloud to handle the second spike.

Another consideration is that some cloud computing systems, such as the DynamoDB® database service, need to be instructed to reduce resources, whereby controlled deprovisioning is needed. Again, such deprovisioning may be subject to constraints as described herein.

In the example of FIG. 4, the number of the services' resource instances at time Te is reduced relative to what they were at time Tc, but in this example the reduction is not to the same level as at time Ta, as the resource instances are instead controlled to different reduced levels as specified by the data service. Such a controlled reduction in resource instances allows the data service to more closely match its historical traffic patterns, rather than let the cloud computing system automatically deprovision resources according to the cloud computing system's own metrics as a reduction in the need for resources is detected. As set forth herein, controlled reduction by the predictive computing resource provisioning logic may better and/or more safely match the actual traffic pattern.

Figure 5:
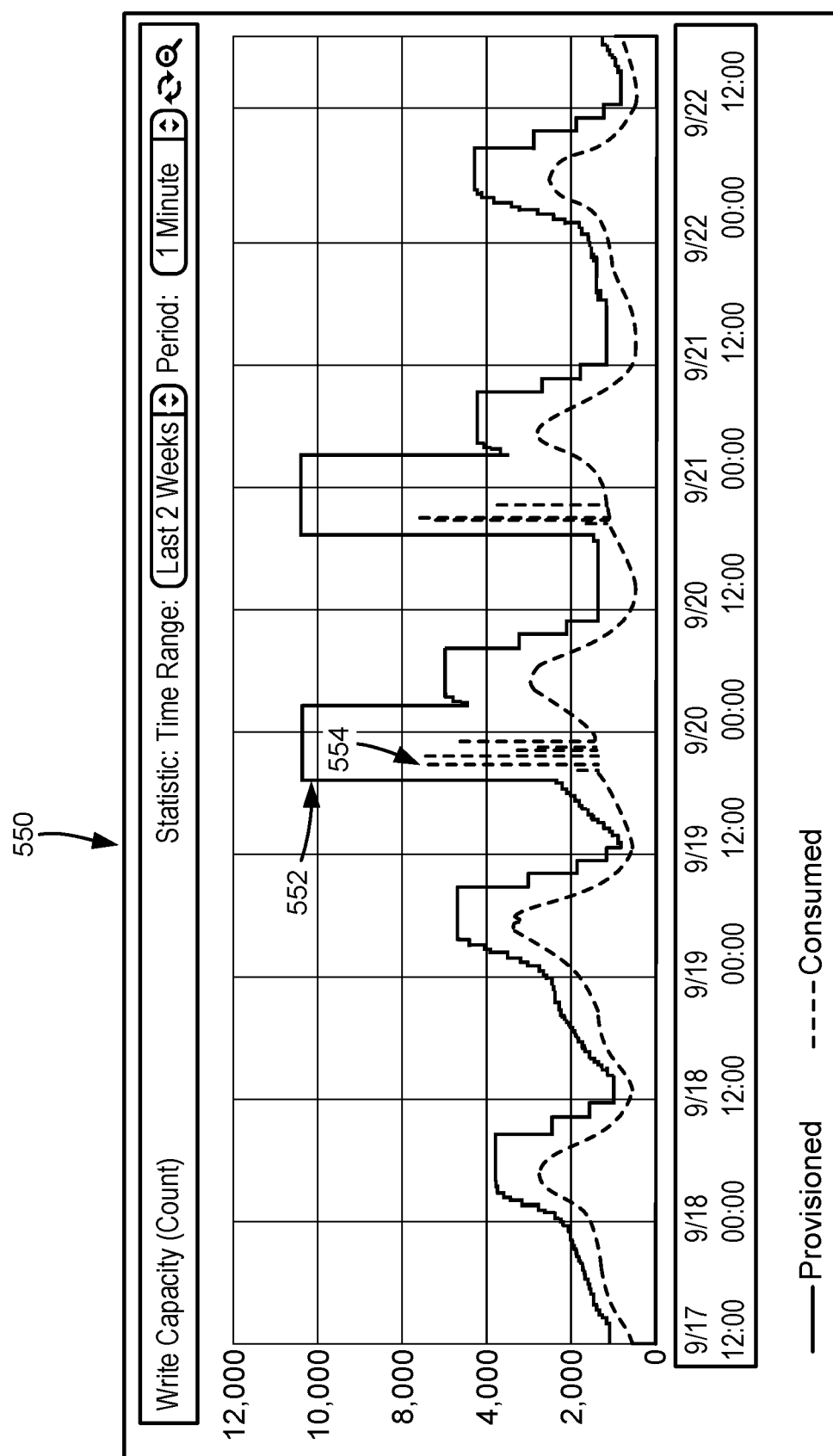
FIG. 5 is an example graphical representation of how proactive provisioning of computing resources based upon predictions occurs before actual demand takes place, according to one or more example implementations.

FIG. 5 shows a graph 550 of traffic-related requests collected every minute for a certain resource usage-related metric (write counts) over some time frame, e.g., five days within the last two weeks. The solid line represents the provisioned amount of resources, while the dashed line represents the actual resources consumed, using units of write counts as a gauge of resource provisioning. Note that the dashed line in FIG. 5 is actually a smoothed representation of a stepped "line" of a number of actual counts plotted every minute, and is only shown in dashed form to distinguish it from the solid line of provisioned write counts (the metric corresponding to resources available for use).

As can be seen in FIG. 5, because of historical-based prediction for proactive provisioning as described herein, in this particular example the resources that are provisioned and available are always greater than the resources that are consumed at any time during this measurement time range. That is, the resource consumption as measured in write count capacity is not exceeded by the actual resources needed to meet the actual write counts in this example. The predictive aspect of the resource provisioning is readily apparent in FIG. 5, as resource provisioning increases before (in actual time) the actual consumption increases, as particularly emphasized by the solid line in the area near the point 552, which shows the increase in provisioned resources taking place in sufficient time before the actual write count spike occurs in the area around the point 554.

Figure 6A:
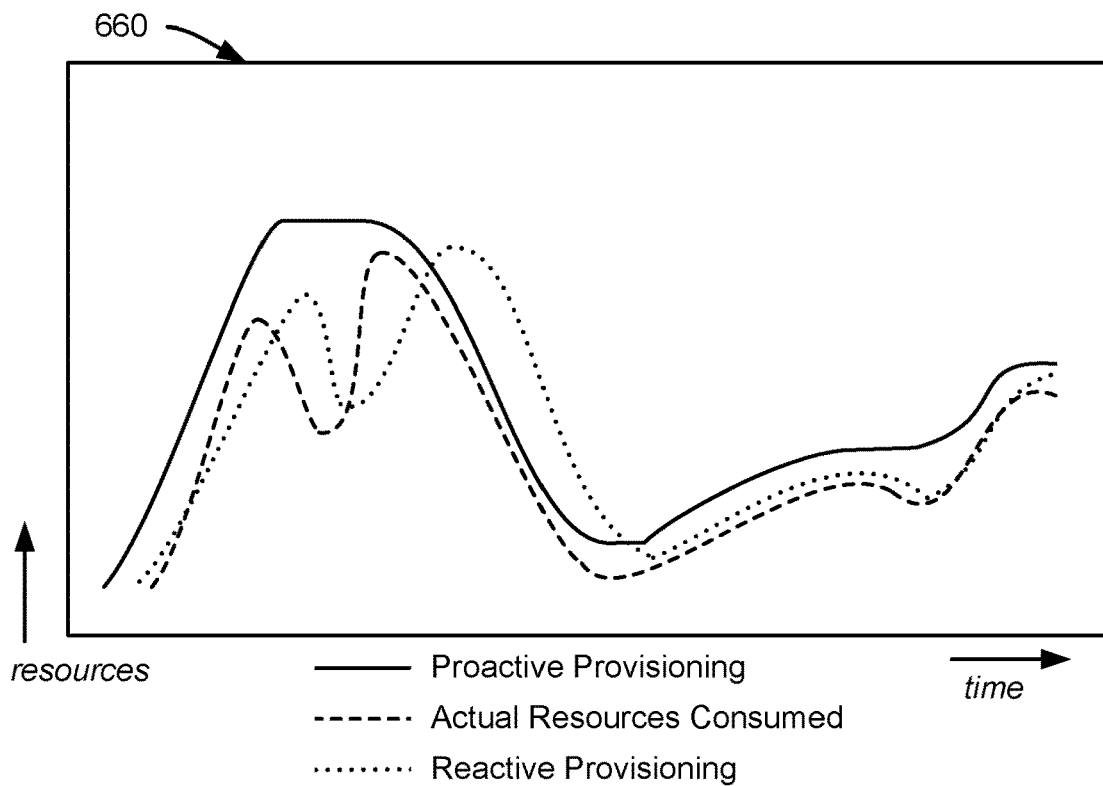
FIG. 6A is an example hypothetical graphical representation of proactive provisioning of computing resources versus reactive provisioning versus actual demand, according to one or more example implementations.

FIG. 6A is a hypothetical graph 660 showing actual resource consumption (the dashed line) versus proactive resource provisioning (the solid line) based upon the predictive technology described herein versus reactive resource provisioning (the dotted line) based upon the cloud service's detection. As can be seen, the proactive resource provisioning leads (in time) the actual resource consumption, whereas conventional reactive provisioning often lags the actual resource consumption, meaning that some number of client requests are not properly handled, particularly around spikes.

Figure 6B:
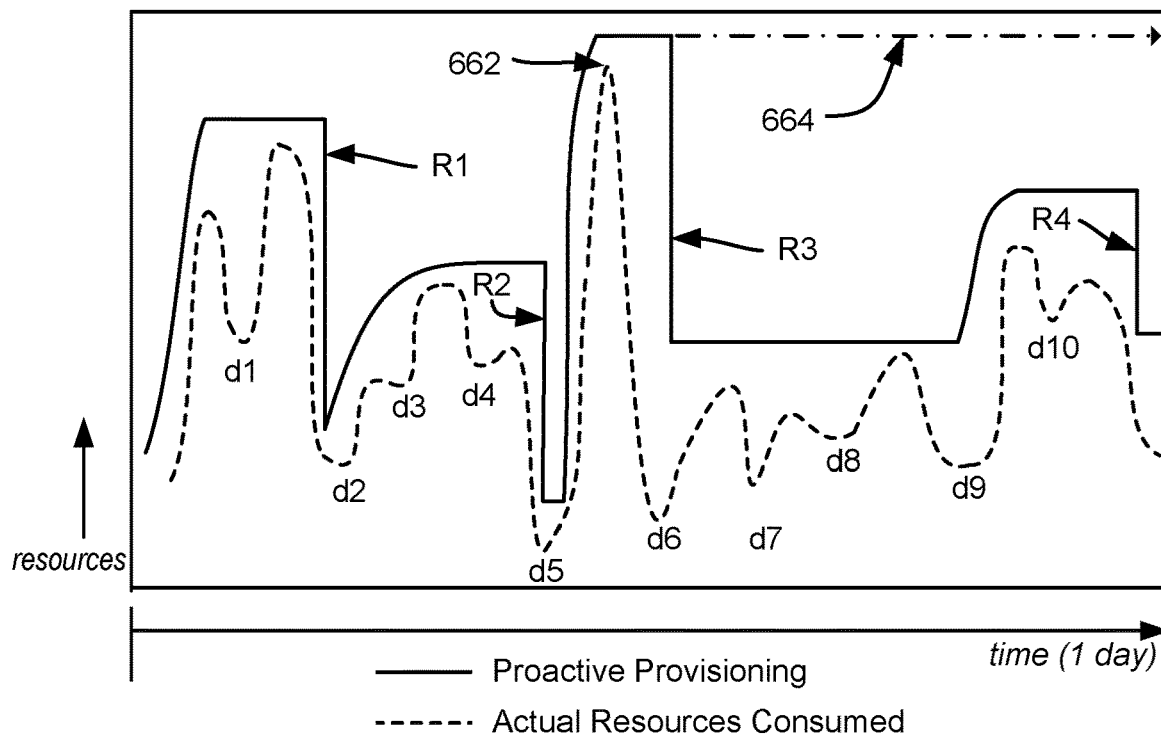
FIG. 6B is an example hypothetical graphical representation of proactive provisioning of computing resources versus actual demand, including factoring in provisioning-related constraints, according to one or more example implementations.

FIG. 6B is another hypothetical graph similarly exemplifying actual resource consumption (the dashed line) versus proactive resource provisioning (the solid line) based upon the predictive technology described herein. In addition, FIG. 6B illustrates the concept of constraints, in that in this example, only four resource reductions per day (a twenty-four hour cycle) are possible. Thus, the predictive/historical data needs to be analyzed within the context of this limiting constraint, otherwise, for example, the number of resources at the point of the highest increase (point 662) after the fourth actual decrease (d4, with the lowest point of each actual decrease represented by d1-d10) cannot be reduced until the next day. This potential idling/wasting of resources is represented in FIG. 6B by the dashed, dotted line 664 and the area thereunder.

Instead, based upon one or more analyses of the predictive historical data (e.g., sampled over many days), and in view of the four decreases per day constraint, the four resource decreases are selected over the entire twenty-four hour time span, e.g., with the actual resource reduction drops labeled R1-R4 in FIG. 6B. As can be readily appreciated, a cost savings calculation may be used, e.g., select each possible permutation of four decrease points and compute which combination of four provides the lowest overall cost. Note that the total number of decrease points to evaluate can be first reduced using a threshold decrease value; e.g., do not consider a reduction in resource consumption to be a decrease unless the decrease is at least an X % drop. Further, it is understood that the selection may be per shape of each day's graph; that is, Monday's four decrease times may be significantly different from Sunday's four decrease times, a holiday may have a different graph shape (and thus a different set of decrease times) relative to the same day of the week when not a holiday, and so on.

Still further note that the chosen number of decrease points need not match the constraint limit (of four in this example). For example, consider that the shape of the actual resource usage graph is relatively level, and thus most resource decreases are not worth much in cost savings; it may be more cost effective to save a decrease request (or more than one) for possible near real-time reduction rather than scheduled use just in case an unexpected/unpredicted spike occurs that would otherwise result in a relatively costly excess resource allocation with no ability to reduce the allocation until the next day. Thus, the shape of the graph corresponding to cost savings may be a factor in deciding whether to use each constraint-limited resource reduction.

Another example of not necessarily using the reduction request limit is when the (e.g., four) most cost saving decreases occur early in the twenty-four hour cycle; it again may be deemed better to select a number of decreases that is less than the constraint limit and save one (or more) for possible near real time use just in case an unexpected/unpredicted spike occurs and wastes resources for the remainder of the twenty-four hour cycle. Thus, the time of a decrease point (e.g., relative to the twenty-four hour cycle) may be a factor in deciding whether to select that point in time or not for a resource reduction operation.

Figure 7:
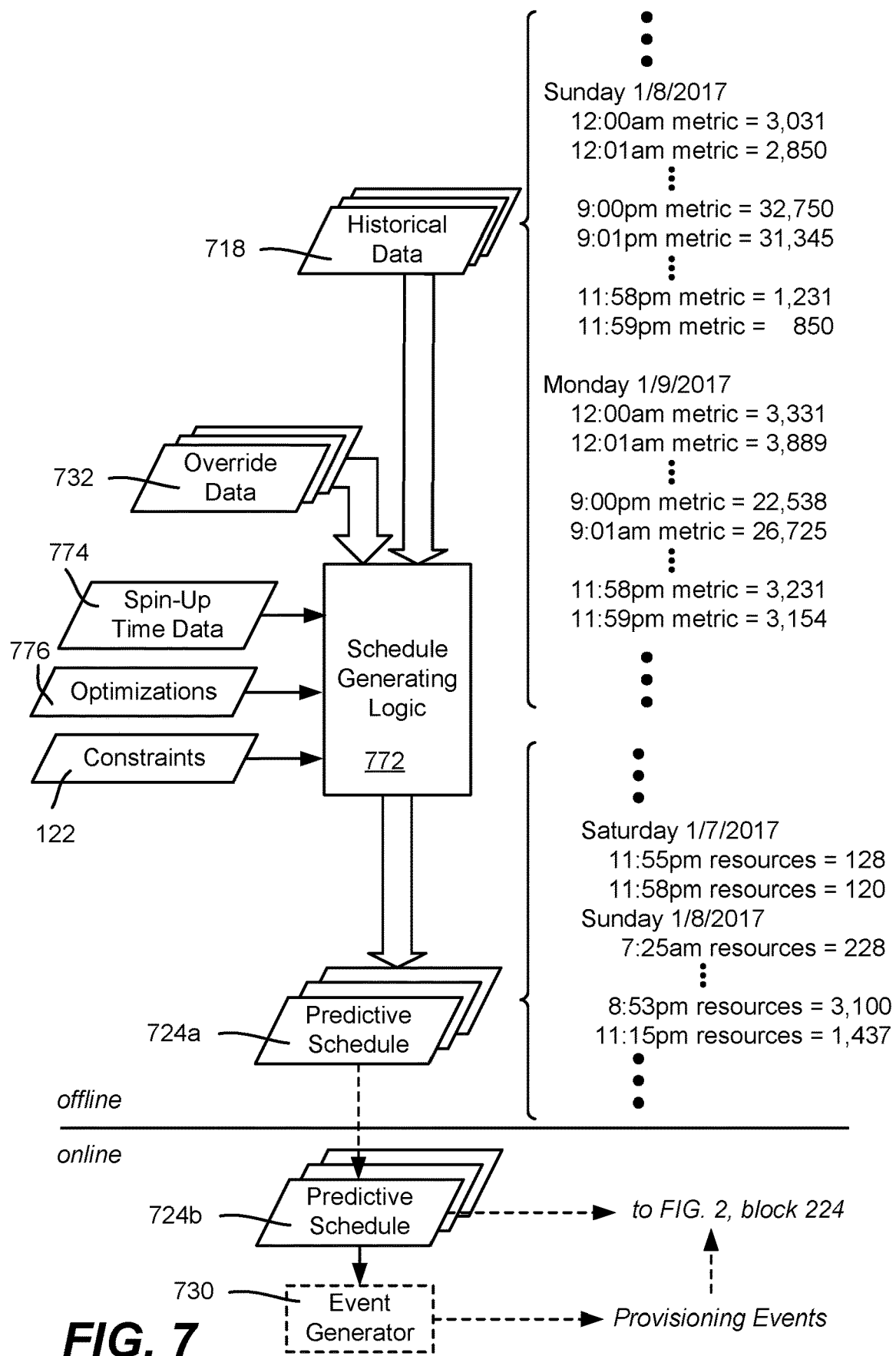
FIG. 7 is an example block diagram representation of how a proactive provisioning schedule that predicts resource needs may be offline generated from historical data and other data, according to one or more example implementations.

Turning to another aspect, FIG. 7 shows the concept of offline processing historical data (e.g., of one or more datasets 718) by schedule generating logic 772 into one or more schedules 724 (the offline copy or copies are labeled 724a, while the copy or copies used online when needed are labeled 724b). Note that there may be a single schedule or multiple schedules, e.g., one schedule for each type of service for which resources are provisioned. As described herein and as represented by FIG. 2, block 224, one of the ways to perform proactive provisioning is to have the predictive computing resource provisioning logic 114 read the schedule of provisioning data and times, while another is for the predictive computing resource provisioning logic 114 receive the data and times as provisioning events derived from such a schedule, (e.g., by an optional event generator 730). FIG. 7 shows these possible online operations as dashed arrows.

In general, to gather the historical data, actual client requests or the like corresponding to a need for client resources may be counted over some collection time frame, such as a month. This can be accomplished without frustrating client users by overprovisioning resources while the initial measurements are collected. Once the initial data starts to be used for predictively provisioning resources as described herein, the historical datasets may be continually updated without needing to overprovision.

In the example of FIG. 7, historical data 718 may be maintained in any suitable way, e.g., as a single dataset, or multiple datasets (e.g., one historical dataset per month, one per service, and so on). A straightforward key-value pair such as (timestamp, actual resource instance count) may be used as part of the dataset. For convenience, the historical data may be divided among different datasets, such as a Monday (non-holiday) dataset, a Monday holiday dataset, and so on. Multiple similar datasets may be combined, such as by pre-processing or otherwise combined at the time of generating the schedule, e.g., by choosing the maximum (or average, median or mode, possibly after discarding outliers) number of resources that were actually needed at each time of collection, possibly adding in some safety buffer.

In any event, the historical data 718 is typically used to generally predict future resource needs. However, also shown in FIG. 7 is the concept of override data 772, (which may be considered a form of state data 118 (FIGS. 1 and 2)). Override data 772 may be something manually configured or otherwise collected for predicted likely exceptions. As exemplified above, a one-time special programming event may not have actual historical data, but is likely to receive hundreds of thousands of requests starting at 8:00 pm Monday night, whereas the ordinary Monday night 8:00 pm time slot may only have a few thousand requests. Similarly, other occurrences such as the first run of a popular series episode is historically related to a spike in requests, and thus override data may plan for such a spike on the day and time that the first run becomes available, and also ensure that not too many resources are provisioned on a similar day and time when a less popular program or a rerun or the like is instead made available. Thus, the predictive schedule 724a is based on predictive data that may, for example, be historical data overridden by any override (and/or other state) data.

Other factors that may be considered part of the schedule generating logic 772 shown in FIG. 7 include any constraints 122 as described herein, e.g., with respect to FIG. 6B. Another factor is the spin-up time data 774, particularly if this number is not a fixed time, but instead varies as a function of the amount of resources being changed. For example, it may take up to five minutes to spin up 1-to-X additional resource instances, up to six minutes to spin up X-to-Y additional resource instances, and up to seven minutes to spin up more than Y additional resource instances; (e.g., because more instances need more physical machines as well as virtual machines, and possibly more network reconfiguration operations). As can be appreciated, a more complex formula may be available. Note that there may be an entirely different set of needs (e.g., a different formula) for deprovisioning versus provisioning.

Another possible factor is the concept of optimizations 776. For example, it may be more cost effective (and/or a requirement of the cloud system) to step up the number of needed resources rather than specify a large increase all at once. Smoothing is another possible consideration; e.g., do not request a reduction in resources unless the reduction is at least five resources instances. Another possible way of optimizing/smoothing is to not request a resource reduction (or request only a partial one) if a secondary spike in requests is predicted to occur shortly after a first spike occurs, because there may not be enough time to first reduce and then re-increase the number of needed instances.

Figure 8:
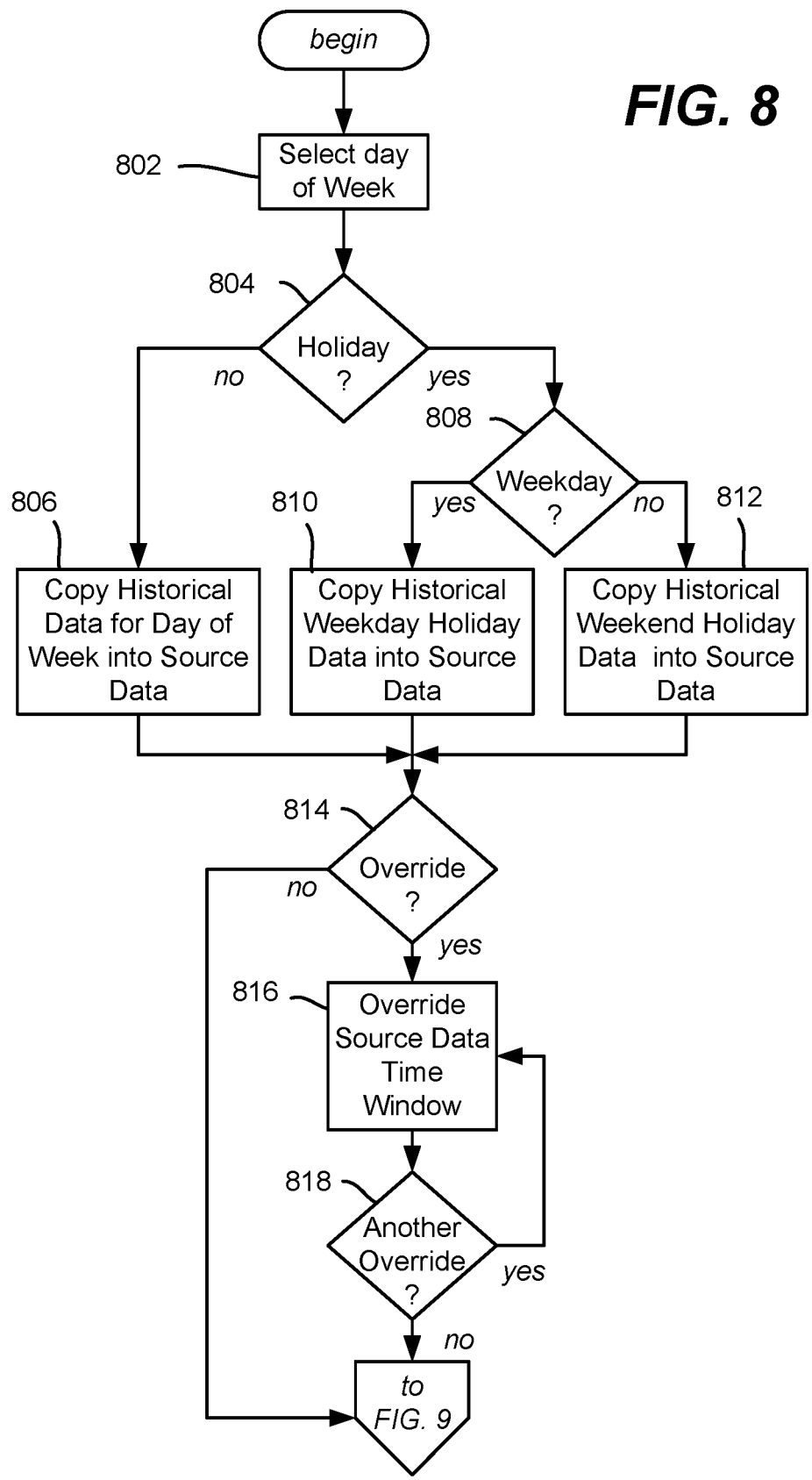
FIGS. 8-10 comprise a flow diagram having example steps that show how a proactive provisioning schedule that predicts resource needs may be offline generated from historical data and other data, according to one or more example implementations.
Figure 9:
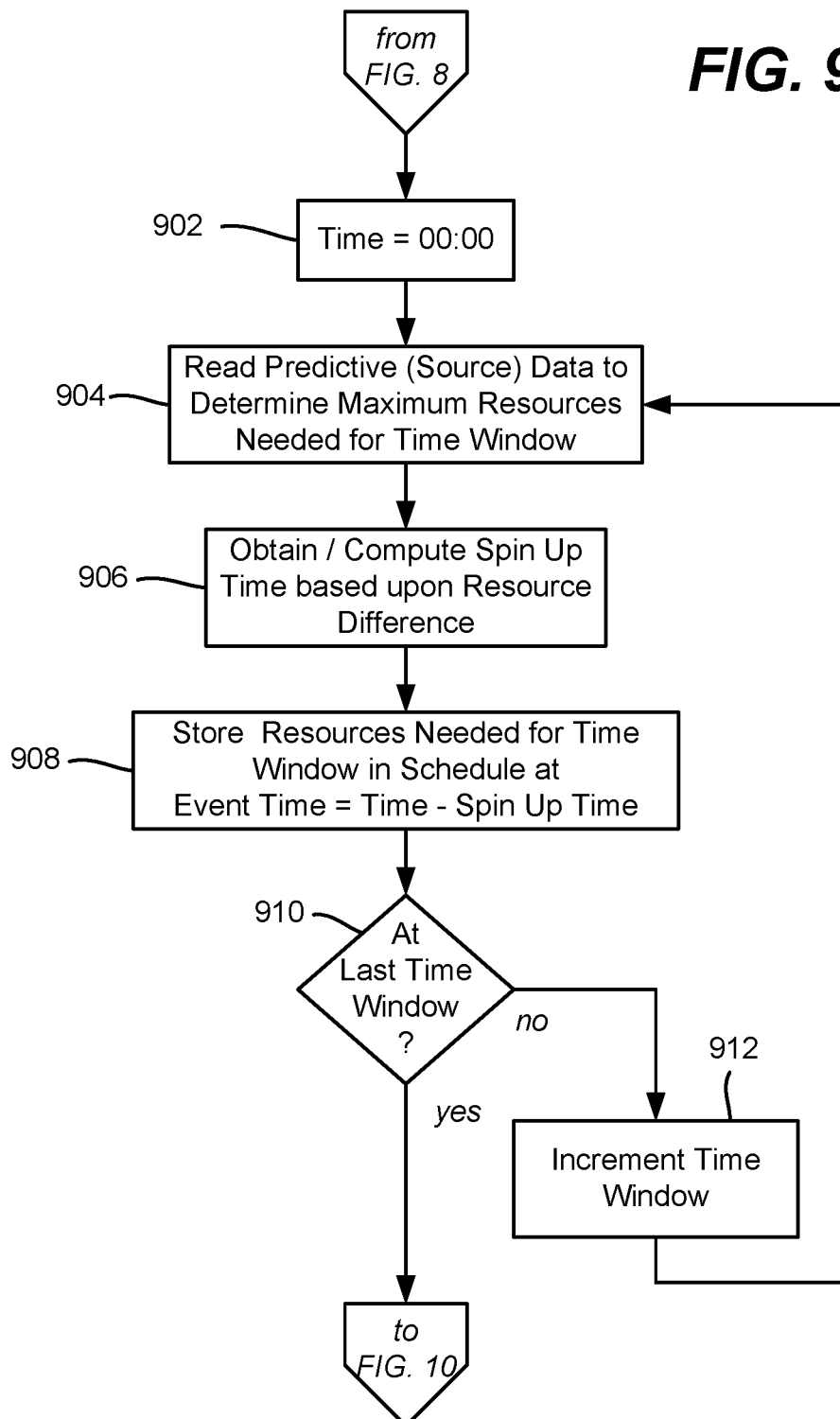
Figure 10:
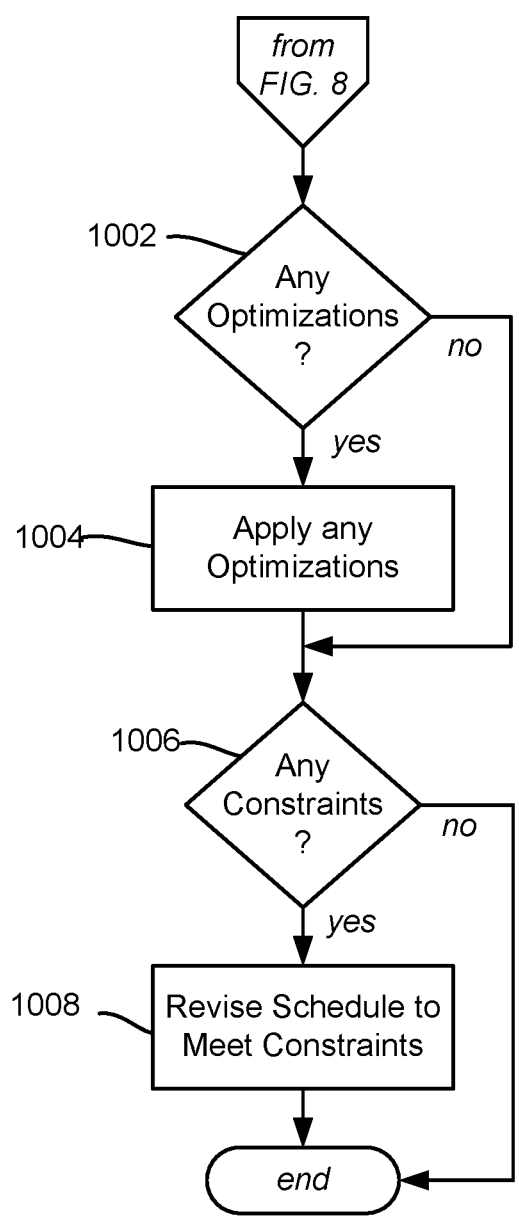

FIGS. 8-10 show a flow diagram of operations, exemplified as steps, for schedule construction for a given day of the week, using the above example of holidays having a different set of historical data. As can be readily appreciated, any distinctions may be made as to what is an ordinary set of historical data versus a non-ordinary set, but for purposes of this example, holidays are chosen as one easy to understand distinction of this type of predictive data.

Step 802 selects the day of the week for which a schedule is to be generated, and step 804 evaluates whether that day is going to be a holiday. If not, the ordinary day of week historical data is used as the source data for the schedule, as represented by step 806. Otherwise in this example, a further distinction as determined by step 808 is made between weekday holiday and weekend holiday historical datasets, represented by steps 810 and 812, respectively.

Once the historical dataset is known as the source data, steps 814 and 816 represents overriding any portion of the source dataset with override data, if such override data exists. For example, most of the historical data may apply for a given day, however a special or premiere event may be planned for the 9 pm to 11 pm time slot. Thus, the predictive data in such an example comprises the regular historical data overridden by the override data for this particular exception. Step 818 repeats overriding other times as well if needed, until all override data replaces regular data in the source dataset.

Once the source data is ready to be used as the predictive data, FIG. 9 begins outputting the schedule. Step 902 starts the schedule time (e.g., at an initial time of midnight), and step 904 reads the predictive source data to determine the maximum resources predicted as being needed for that time. Note that the actual number in the source data may be increased by some factor as a safety buffer, e.g., 1,000 may be increased to 1,100 with a ten percent increase; (the increase need not be linear, e.g., one factor may be used for less than X resources, another factor for between X and Y resources, another for greater than Y resources, and so on).

Step 906 offsets the time based upon the spin up (or spin-down) time; if this is not a fixed time, then the function or table or the like is used to compute or lookup the spin up time based upon the resource delta. Step 908 stores the resources in conjunction with the time; note that the time initially may be that of the night before, e.g., although the historical data is from 12:00 am to 11:59 pm, the schedule is from 12:00 am minus the spin up time (e.g., 11:55 pm the night before) to 11:59 pm minus the spin up time. In any event, the same two times that conflict in the number of resources because of the spin-up offset may be resolved, e.g., by taking the maximum number of resources predicted as being needed whenever two times are the same.

Steps 910 and 912 repeat the process throughout the source data, e.g., one entry for each minute. At this time, a schedule exists, but may be further optimized and/or adjusted for constraints as represented in FIG. 10.

FIG. 10 represents applying any optimizations to the schedule via steps 1002 and 1004. For example, smoothing is one optimization set forth above, so as to only request re-provisioning when a threshold change occurs. Instead of making a change every minute, smoothing can reduce the number of change events, e.g., make a change at two minutes, then five minutes after that, then three minutes after that, and so on. Another type of optimization is to look ahead in the schedule for events such as double-spikes that occur closely in time; it may be more optimal (and possibly less costly) to leave the larger number of resources provisioned for the second spike rather than reduce in between, or reduce resources an amount less than what the data otherwise suggests is possible.

Any constraints are evaluated and handled via steps 1006 and 1008. As exemplified above, one constraint may be a limit on the number of resource reductions per day, e.g., four. In such an example, the schedule may be analyzed to find the four likely most cost-effective reductions, and then the schedule revised based upon the analysis.

Figure 11A:
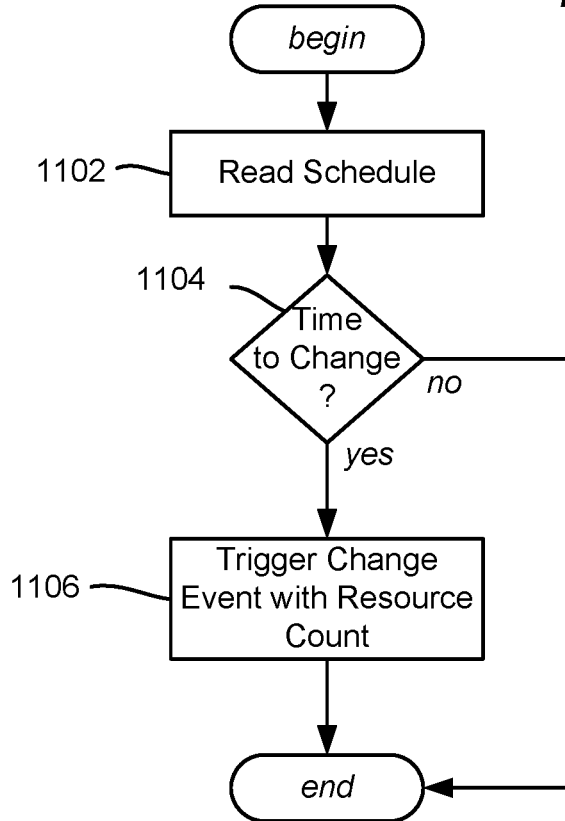
FIG. 11A is a flow diagram showing example steps related to using a provisioning schedule to proactively provision resources before their actual need, according to one or more example implementations.

FIG. 11A shows one way in which an offline schedule may be used online, beginning at step 902 where the schedule is read. As described herein, this may be performed by an event generator or more directly by the predictive computing resource provisioning logic. If the schedule indicates it is time for a change, step 1104 and 1106 make the change, e.g., by providing the number of needed resources from the schedule at the time. Note again that the time is offset by (at least) the resource spin-up time, so that the change in the number of actually availably resources occurs before their actual need.

Figure 11B:
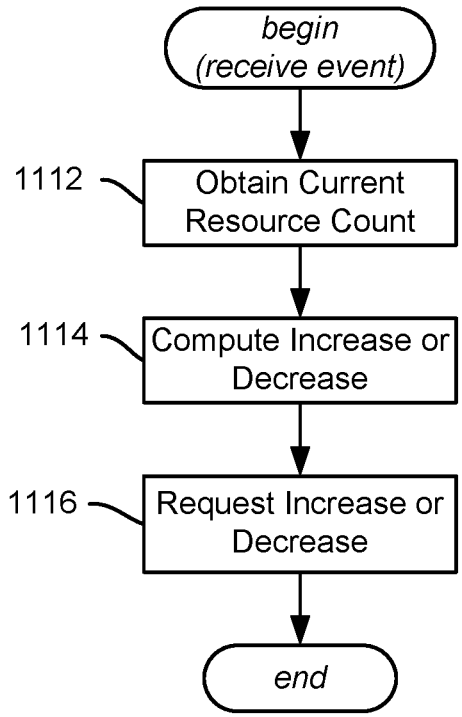
FIG. 11B is a flow diagram showing example steps related to proactively provisioning or deprovisioning resources, according to one or more example implementations.

FIG. 11B shows the concept of adjusting the needed resource count by a relative number rather than an actual number. Step 1112 obtains the current resource count, and step 1114 computes the increase or decrease needed. Step 1116 then requests the difference. Note that this is used when the cloud system specifies that relative changes are to be requested rather than actual counts. In other words, in the above example, if the predictive logic determines that 350 resource instances are needed, and obtains a current resource count of 100, then a 250 resource instance increase is requested. If instead a cloud system takes the actual number rather than a plus or minus relative change, then in general FIG. 11B is not needed, as the actual number needed can be directly requested.

Figure 12:
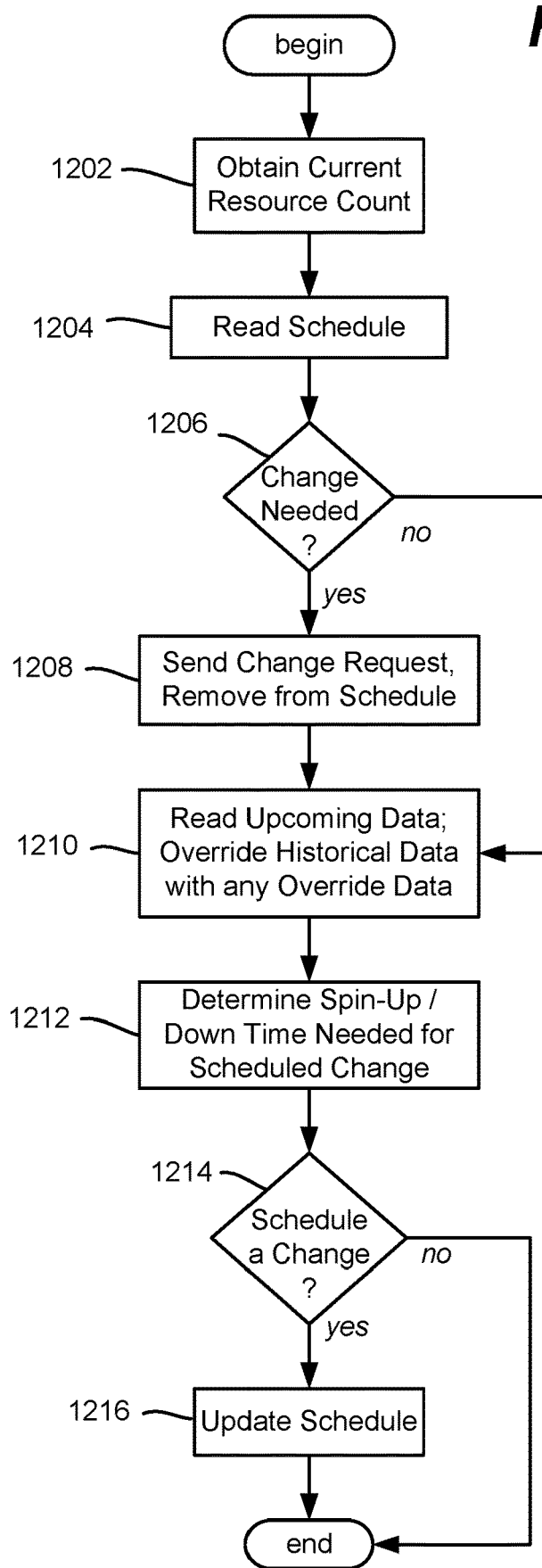
FIG. 12 is a flow diagram showing example steps related to dynamically generating a schedule "online" and using that schedule to provision and deprovision computing resources, according to one or more example implementations.

FIG. 12 shows the concept of using and generating a schedule dynamically. As can be readily appreciated, this is feasible for many types of provisioning operations, but less feasible if constraints (e.g., daily limits) need to be considered as a whole. In general, FIG. 12 may be run every minute or the like, to read the schedule to possibly make changes, and then build the next part of the schedule some number of minutes in advance, e.g., at least up to the maximum spin up time.

Step 1202 represents obtaining the current resource count, and step 1204 represents reading the schedule. If a change is needed as evaluated by step 1206, step 1208 sends the change request (which may be relative to the current resource count), and removes the entry from the schedule. Note that the removal of the entry may not be an actual removal, but for example, may be to move up a pointer in a circular buffer of (times, resource counts).

Steps 1210 and beyond represent building the next part of the schedule. Note that the schedule may be read separately from its being built, however this is (at least similar to) basically building the schedule offline as described above, e.g., possibly with a shorter timeframe than a full day.

In any event, step 1210 reads the upcoming predictive data, that is, the historical data for some upcoming time, as overridden by any override data for that time. Step 1212 determines the spin-up time, which may be fixed or depend on some function, as described above. Step 1214 and 1216 update the schedule if needed.

As is understood, the upcoming data is generally that of the current time plus the maximum possible spin-up time (plus possibly a safety buffer time or the like). For example, if the operations of FIG. 12 runs at 1:01 pm and there is a maximum possible spin-up time of five minutes, then the historical data/override data for 1:07 pm needs to be read, with any change written into the schedule so as to be made for the next run at 1:02 pm if the full five minutes are needed (or later if less spin up time is needed). Smoothing can occur at this step, as can conflict resolution if variable spin-up times cause future-scheduled resource changes to conflict.

It should be noted that the above examples are only some of the various ways to implement the proactive, predictive resource provisioning as described herein. For example, it is feasible for an offline-computed daily schedule to be read, with any overrides being dynamically read and made if needed just before making each resource allocation request.

As can be seen, there is provided predictive resource provisioning that attempts to proactively provision resources before their actual need, so that an appropriate number of resources are actually operational at the time of their need to handle a predicted load. The predictive resource provisioning may be dynamically computed, offline computed or a combination of offline and online computed. The predictive resource provisioning is adaptable to override customary historical data with expected exceptions. The predictive resource provisioning is flexible to handle variable spin-up times, constraints, and optimizations.

One or more aspects are directed towards predicting an upcoming need to increase a set of provisioned resources currently in use from a current number in use to an increased number. Aspects include proactively requesting that the set be increased with additionally provisioned resources based upon the predicting of the upcoming need, in which the proactively requesting of the additionally provisioned resources occurs at a prediction time that is before an actual need of the additionally provisioned resources, (e.g., the provisioned time), to provide time for the additionally provisioned resources time to become operational.

A spin-up time of provisioned resources may be used to determine the prediction time. The spin-up time of provisioned resources may be a function of how many additionally provisioned resources are needed; if so, described herein is obtaining or determining the spin-up time corresponding to how many additionally provisioned resources are needed.

One or more aspects may include building an offline schedule that comprises needed provisioned resource counts and a prediction time for each needed provisioned resource count, in which the offline schedule is based at least in part on predictive data. The offline schedule further may be based at least in part on override data. The schedule may be modified based upon a constraint, and or may be optimized.

A schedule may be dynamically built, with the schedule comprising one or more needed provisioned resource counts and a prediction time for each needed provisioned resource count, in which the schedule is based at least in part on predictive (e.g., historical) data. Proactively requesting that the set be increased may comprise reading the schedule.

Other aspects may include predicting another upcoming need to decrease a set of provisioned resources currently in use from a current number in use to a decreased number, and proactively requesting that the set be decreased.

Predicting the upcoming need to increase a set of provisioned resources currently in use from a current number in use to an increased number may correspond to an increase in a first number of instances of a first service and a second number of instances of a second service.

One or more aspects are directed towards predictive computing resource provisioning logic that specifies data corresponding to an amount of computing resources to provision. The predictive computing resource provisioning logic proactively specifies the data at a prediction time that is prior to an actual need for the computing resources based at least in part on predictive data and an amount of time needed for the provisioned computing resources to become operational.

The computing resources may be provisioned by a cloud computing system. The computing resources may comprise a plurality of virtual machine instances.

The predictive computing resource provisioning logic may use a schedule to specify the data corresponding to the amount of computing resources to provision at the prediction time. An offline schedule generator may provide the schedule based at least in part on the predictive data (e.g., historical data and/override data). The offline schedule generator further may use historical data, override data, one or more constraints, and/or one or more optimizations to provide the schedule.

The predictive computing resource provisioning logic may receive an event, and in response, at the prediction time, may specify the data corresponding to the amount of computing resources to provision.

One or more aspects are directed towards determining a provisioning time at which an amount of computing resources is needed to be provisioned and operational based upon a predicted need for that amount of computing resources. Further described herein is determining a prediction time based upon the provisioning time and an amount of time needed to have that amount of computing resources become provisioned and operational. Aspects include specifying provisioning data at the prediction time to have the amount of computing resources provisioned and operational by the provisioning time.

Determining the provisioning time may comprise processing historical data. Specifying the provisioning data at the prediction time may comprise reading a schedule.

Example Computing Device

The techniques described herein can be applied to any device or set of devices (machines) capable of running programs and processes. It can be understood, therefore, that servers, virtual and/or physical machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 13 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 13:
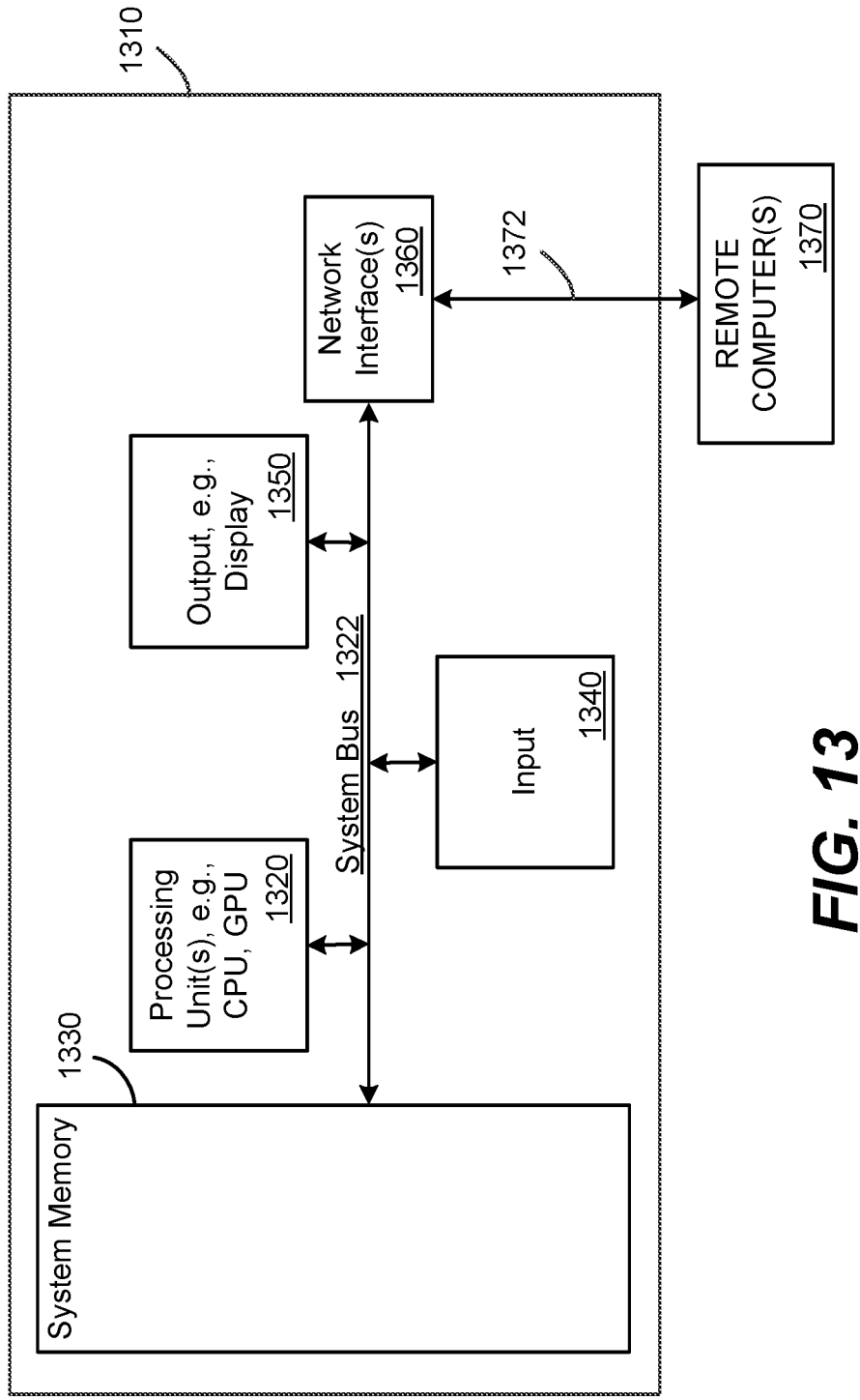
FIG. 13 is a block diagram representing an example computing environment into which aspects of the subject matter described herein may be incorporated.

FIG. 13 thus illustrates an example of a suitable computing system environment 1300 in which one or aspects of the implementations described herein can be implemented, although as made clear above, the computing system environment 1300 is only one example of a suitable computing environment and is not intended to suggest any limitation as to scope of use or functionality. In addition, the computing system environment 1300 is not intended to be interpreted as having any dependency relating to any one or combination of components illustrated in the example computing system environment 1300.

With reference to FIG. 13, an example device for implementing one or more implementations includes a general purpose computing device in the form of a computer 1310. Components of computer 1310 may include, but are not limited to, a processing unit 1322, a system memory 1330, and a system bus 1324 that couples various system components including the system memory to the processing unit 1322.

Computer 1310 typically includes a variety of machine (e.g., computer) readable media and can be any available media that can be accessed by a machine such as the computer 1310. The system memory 1330 may include computer storage media in the form of volatile and/or nonvolatile memory such as read only memory (ROM) and/or random access memory (RAM), and hard drive media, optical storage media, flash media, and so forth. By way of example, and not limitation, system memory 1330 may also include an operating system, application programs, other program modules, and program data.

A user can enter commands and information into the computer 1310 through one or more input devices 1340. A monitor or other type of display device is also connected to the system bus 1324 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

Conclusion

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
predicting, by a system comprising a processor, an upcoming time at which there-is predicted to be a need for additional resources relative to a current amount of resources in use by the system, in association with providing steaming video services to client devices, wherein the predicting the upcoming time is based on historical data regarding historical traffic patterns associated with usage of the video streaming services;
determining, by the system, an amount of spin-up time needed to make the additional resources ready for operation by the upcoming time;
requesting, by the system, provisioning of the additional resources to begin at a point in time prior to the upcoming time, wherein the point in time is based on the upcoming time and the amount of spin-up time; and
building, by the system, a schedule that identifies predicted amounts of resources needed at different points in time over a defined period of time and respective start times for starting re-provisioning of the resources over the defined period of time to facilitate providing the amounts of the resources at the different points in time, wherein the building comprises building the schedule based on the historical data, and building the schedule based on a constraint regarding a number of re-provisioning events allowed over the defined period of time.

2. The method of claim 1, wherein the determining comprises determining the amount of spin-up time as a function of an amount of the additional resources that are needed.

3. The method of claim 1, wherein the building further comprises, building the schedule based on override data regarding a known upcoming event within the defined time frame that is not represented in the historical data.

4. The method of claim 1, further comprising, optimizing the schedule to minimize costs associated with under provisioned and overprovisioned amounts of the resources.

5. The method of claim 1, further comprising:
generating, by the system, simulated traffic corresponding to an expected amount of traffic to be received at the upcoming time; and
increasing, by the system, the current amount of the resources by an amount needed to handle simulated traffic, resulting in the additional resources being available at the upcoming time.

6. The method of claim 1, further comprising:
generating, by the system, simulated traffic corresponding to an expected amount of traffic to be received at the upcoming time; and
provisioning, by the system, the additional resources at the point in time to account for the simulated traffic, resulting in the additional resources being available at the upcoming time.

7. The method of claim 1, further comprising:
determining, by the system, an amount of the additional resources that are needed based on historical resource allocation data regarding historical allocation of system resources in association with the historical traffic patterns.

8. The method of claim 1, wherein the predicting further comprises predicting the upcoming time based on popularity of video content that will become available for steaming at the upcoming time.

9. The method of claim 1, wherein the predicting further comprises predicting the upcoming time based on an upcoming event for which there is no corresponding historical data.

10. The method of claim 1, wherein the predicting further comprises predicting the upcoming time based on whether video content that will be available for steaming at the upcoming time was previously available for streaming.

11. A method comprising:
predicting, by a system comprising a processor, an upcoming time at which there-is predicted to be a need for additional resources, relative to a current amount of resources in use by the system, in association with providing steaming video services to client devices, wherein the predicting the upcoming time is based on historical data regarding historical traffic patterns associated with usage of the video streaming services;
determining, by the system, an amount of spin-up time needed to make the additional resources ready for operation by the upcoming time;
requesting, by the system, provisioning of the additional resources to begin at a point in time prior to the upcoming time, wherein the point in time is based on the upcoming time and the amount of spin-up time;
generating, by the system, simulated traffic corresponding to an expected amount of traffic to be received at the upcoming time; and
increasing, by the system, the current amount of the resources by an amount needed to handle simulated traffic, resulting in the additional resources being available at the upcoming time.

12. The method of claim 11, wherein the determining comprises determining the amount of spin-up time as a function of an amount of the additional resources that are needed.

13. The method of claim 11, further comprising:
building, by the system, a schedule that identifies predicted amounts of resources needed at different points in time over a defined period of time and respective start times for starting re-provisioning of the resources over the defined period of time to facilitate providing the amounts of the resources at the different points in time, wherein the building comprises building the schedule based on the historical data.

14. The method of claim 13, wherein the building further comprises, building the schedule based on override data regarding a known upcoming event within the defined time frame that is not represented in the historical data.

15. The method of claim 11, further comprising:
determining, by the system, an amount of the additional resources that are needed based on historical resource allocation data regarding historical allocation of system resources in association with the historical traffic patterns.

16. A method comprising:
predicting, by a system comprising a processor, an upcoming time at which there-is predicted to be a need for additional resources, relative to a current amount of resources in use by the system, in association with providing steaming video services to client devices, wherein the predicting the upcoming time is based on historical data regarding historical traffic patterns associated with usage of the video streaming services;
determining, by the system, an amount of spin-up time needed to make the additional resources ready for operation by the upcoming time;
requesting, by the system, provisioning of the additional resources to begin at a point in time prior to the upcoming time, wherein the point in time is based on the upcoming time and the amount of spin-up time;

generating, by the system, simulated traffic corresponding to an expected amount of traffic to be received at the upcoming time; and provisioning, by the system, the additional resources at the point in time to account for the simulated traffic, resulting in the additional resources being available at the upcoming time.

17. The method of claim 16, wherein the determining comprises determining the amount of spin-up time as a function of an amount of the additional resources that are needed.

18. The method of claim 16, wherein the predicting further comprises predicting the upcoming time based on popularity of video content that will become available for steaming at the upcoming time.

19. The method of claim 16, wherein the predicting further comprises predicting the upcoming time based on an upcoming event for which there is no corresponding historical data.

20. The method of claim 16, wherein the predicting further comprises predicting the upcoming time based on whether video content that will be available for steaming at the upcoming time was previously available for streaming.

* * * * *